May 4, 1926.
J. W. KROENING
VALVE TOOL
Filed Nov. 10, 1924
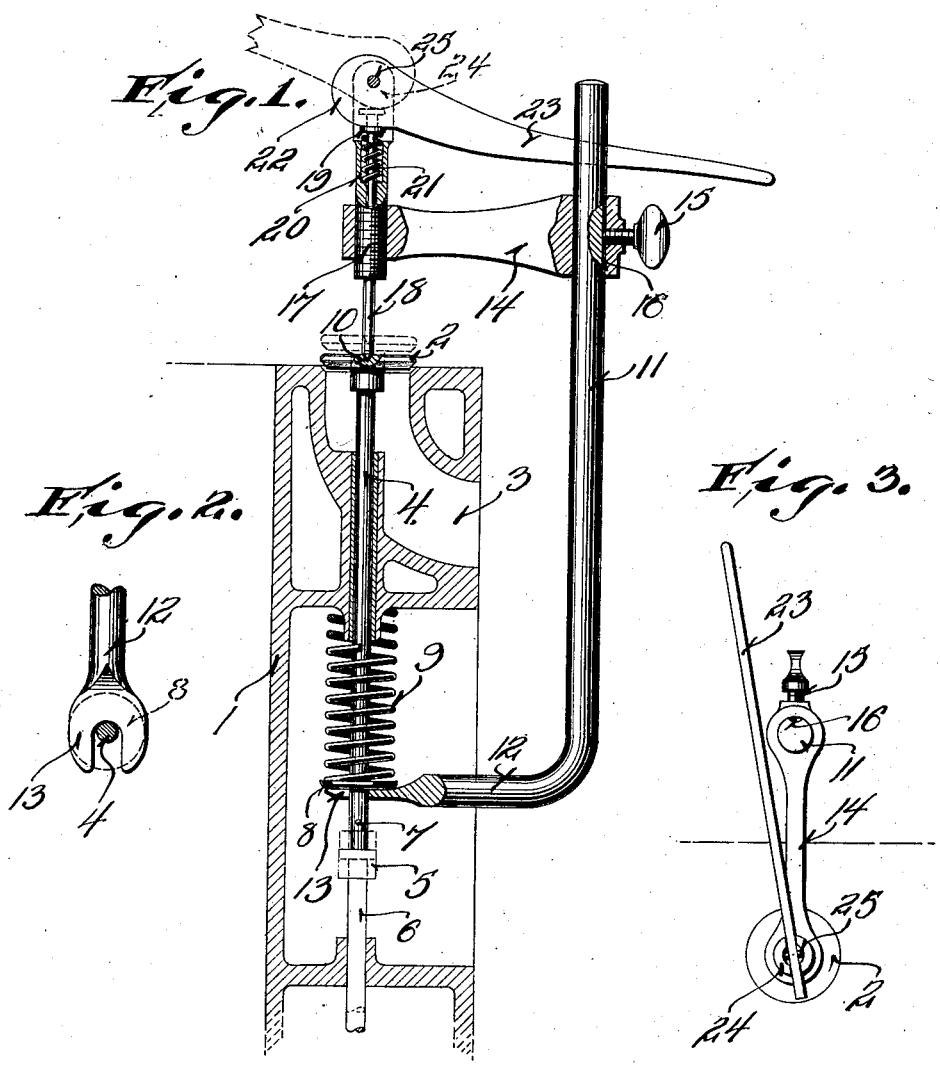

Patented May 4, 1926.

1,583,399

UNITED STATES PATENT OFFICE.

JULIUS W. KROENING, OF MILWAUKEE, WISCONSIN.

VALVE TOOL.

Application filed November 10, 1924. Serial No. 748,909.

*To all whom it may concern:*

Be it known that I, JULIUS W. KROENING, a citizen of the United States, and resident of Milwaukee, in the county of Milwaukee and State of Wisconsin, have invented certain new and useful Improvements in Valve Tools; and I do hereby declare that the following is a full, clear, and exact description thereof.

This invention relates to valve tools and is particularly directed to a tool adapted to compress the spring on the tappet valve of an automobile engine.

Various attempts have been made to facilitate the removal of the valves by providing means adapted to be forced under the spring and aid in the removal of the valve, but these devices have not proven satisfactory for the reason that they were uncertain in their action and require an immense amount of effort to position them. Further, they were not adapted for the handling of valves of different types of engines.

This invention is designed to overcome the above noted defects, and objects of such invention are to provide a valve tool which may be quickly positioned with reference to the valve and spring, which may be easily operated to compress the spring and retain it in a compressed condition thus permitting the easy removal of the pin.

Further objects are to provide a valve tool which is adjustable to adapt it to any type of automobile engine valve, and which is so constructed that a preliminary rough adjustment may be attained followed by an accurate adjustment and thereafter followed by a positive compression of the valve spring through simple and easily operated mechanism.

An embodiment of the invention is shown in the accompanying drawings, in which:—

Figure 1 is a vertical sectional view through a tappet valve and associated parts of an engine showing the device in position and showing the spring compressed by the device, such device being partly in section for the sake of clearness.

Figure 2 is a view of the lower end of the device.

Figure 3 is a plan view of the device as it appears in Figure 1.

Referring to the drawings, it will be seen that a portion 1 of an internal combustion engine has been shown and the usual type of tappet 2 controlling a port 3. This tappet valve is provided with a spindle 4 which extends downwardly through a portion of the engine casting and seats within a socket 5 of the cam actuated rod 6. A pin 7 is passed through the valve rod and a washer 8 is forced against such pin by means of a relatively heavy compression spring 9.

These valves are regularly provided with a centrally positioned aperture 10 in their upper faces as is well known.

The device comprises a shank 11 provided with an inwardly projecting right angle arm 12. This arm terminates in a bifurcated portion providing a pair of arms 13. These arms are formed by a flattened portion of the angular extension of the rod, as clearly shown in Figure 1, and are preferably provided with tapered forward edges to facilitate their insertion between the cup-shaped washer 8 and the pin 7. The upper portion of the rod carries a slidably or adjustably mounted arm 14 which is apertured to receive the rod and is provided with a set screw 15.

It is to be noted that the rod 11 is provided with a groove 16 within which the set screw seats, thus holding the arm 14 against rotation relatively to the rod 11. The other end of the rod 14 is provided with a threaded aperture within which is screwed an adjustable sleeve 17. This sleeve is itself provided with an aperture which slidably receives a pin 18 provided with a point at its lower end, and with an enlarged head 19 at its upper end. It is to be noted that the sleeve 17 is provided with an enlarged recess 20 at its upper portion which receives a small compression spring 21, such spring pressing upwardly against the head 19 and urging the rod or pin 18 upwardly. The upper portion of the sleeve 17 is slotted and receives the cam portion 22 of a manually operable lever 23, such lever being pivoted between the extensions 24 of the sleeve 17 by means of the pin 25.

In using the device, the arm 14 is roughly adjusted with reference to the shank 11 to correctly space the fingers 13 at the lower end of the arm with reference to the upper portion of the device. Thereafter, the fingers 13 are slipped between the washer 8 and the pin 7, as shown in Figure 1, and the lever 23 is held in a substantially upwardly projecting direction and the sleeve 17 rotated thereby, until the pointed end of the pin 18 seats within the recess 10 in the valve 2.

Thereafter, the lever 23 is rocked downwardly into the full line position shown in Figure 1, thus forcing the pin 18 downwardly and in consequence elevating the rod 11. This lifts the finger 13 and accordingly compresses the spring 9 into the position shown in Figure 1.

It will be seen that the pin 7 is now free from engagement with any other portion of the device and may be most easily removed. Thereafter, the spring is released by rocking the lever 23 into the dotted line position thus releasing the device and permitting removal of the valve.

It is to be noted that the cam 22 is provided with a flat portion so as to hold the pin 18 downwardly in its extreme position, as shown in full lines in Figure 1, thus allowing the operator to release his hold upon the lever.

It will be seen, therefore, that a valve tool has been provided which may be very quickly and readily adjusted to the particular type of valve to be removed, and which may be very easily operated in a simple and effective manner.

Although the invention has been described in considerable detail, it is to be understood that the invention may be variously embodied and is, therefore, to be limited only as claimed.

I claim:

1. A valve tool comprising a shank, a laterally extending part adjacent one end thereof, said part having means for spanning a valve stem, an arm adjustably mounted upon said shank, a sleeve screwed through said arm and adapted for adjustment relative to said arm, said sleeve having an aperture therethrough, a pin slidably mounted within said aperture and having a pointed lower end adapted to engage said valve and having an enlarged upper end, a spring carried within said sleeve and bearing against said enlarged end, and a lever pivoted to said sleeve and having a cam face engaging the enlarged end of said pin.

2. A valve tool comprising a shank having a laterally projecting lower end provided with spaced fingers tapered at their outer ends, an arm slidably mounted upon said shank, cooperative means between said arm and said shank for preventing rotary motion of said arm relatively to said shank and for locking said arm in adjusted position upon said shank, a threaded sleeve screwed through the outer end of said arm and having an aperture therethrough, a pin slidably mounted within said aperture and having an enlarged upper head, a spring carried within said sleeve and bearing against said head, a lever pivoted to said sleeve and having a cam face contacting with said head, said cam face having a flat portion for temporarily locking the pin in its lowermost position.

In testimony that I claim the foregoing I have hereunto set my hand at Milwaukee, in the county of Milwaukee and State of Wisconsin.

JULIUS W. KROENING.